United States Patent [19]
Tseng et al.

[11] Patent Number: 5,568,931
[45] Date of Patent: Oct. 29, 1996

[54] BRUSH SEAL

[75] Inventors: Wu-Yang Tseng, West Chester; Brent L. Bristol, Milford; Rolf R. Hetico, Cincinnati; Christopher C. Glynn, Hamilton, all of Ohio

[73] Assignee: General Electric Company, Cincinnati, Ohio

[21] Appl. No.: 932,463

[22] Filed: Aug. 20, 1992

[51] Int. Cl.⁶ .................................................. F16J 15/48
[52] U.S. Cl. ............................................. 277/53; 415/230
[58] Field of Search ............................. 277/53, 55, 56, 277/216, 192; 415/230, 174.5

[56]  References Cited

U.S. PATENT DOCUMENTS

| Re. 30,206 | 2/1980 | Ferguson et al. . |
|---|---|---|
| Re. 30,600 | 5/1981 | Long et al. . |
| 885,032 | 4/1908 | De Ferranti . |
| 2,878,048 | 3/1959 | Peterson . |
| 3,917,150 | 11/1975 | Ferguson et al. . |
| 4,202,554 | 5/1980 | Snell . |
| 4,204,629 | 5/1980 | Bridges . |
| 4,218,189 | 8/1980 | Pask . |
| 4,265,455 | 5/1981 | Lundgren . |
| 4,269,420 | 5/1981 | Persson . |
| 4,358,120 | 11/1982 | Moore . |
| 4,411,594 | 10/1983 | Pellow et al. . |
| 4,415,309 | 11/1983 | Atterbury . |
| 4,595,207 | 6/1986 | Popp . |
| 4,600,202 | 7/1986 | Schaeffler et al. . |
| 4,645,362 | 2/1987 | Orte . |
| 4,678,113 | 7/1987 | Bridges et al. . |
| 4,696,480 | 9/1987 | Jornhagen . |
| 4,755,103 | 7/1988 | Streifinger . |
| 4,756,536 | 7/1988 | Belcher . |
| 4,781,388 | 11/1988 | Wohrl et al. . |
| 4,809,990 | 3/1989 | Merz . |
| 4,971,336 | 11/1990 | Ferguson . |
| 5,026,252 | 6/1991 | Hoffelner . |
| 5,029,875 | 7/1991 | Spain et al. . |
| 5,031,922 | 7/1991 | Heydrich . |
| 5,042,823 | 8/1991 | Mackay et al. ............... 277/53 |
| 5,090,710 | 7/1993 | Flower ........................... 277/53 |

FOREIGN PATENT DOCUMENTS

| 9121398 | 10/1991 | United Kingdom . |
|---|---|---|
| 2250789 | 6/1992 | United Kingdom . |
| 2250790 | 6/1992 | United Kingdom . |

Primary Examiner—Daniel G. DePumpo
Attorney, Agent, or Firm—Andrew C. Hess; Patrick R. Scanlon

[57]  ABSTRACT

There is provided by the present invention a brush seal including apparatus for reducing bristle vibrations, such as a damper, that engages the upstream side of the bristle pack of the brush seal so as to absorb vibrations and therefore reduce chamfering of the bristle pack.

2 Claims, 5 Drawing Sheets

BRUSH SEAL

The present invention relates in general to a sealing element and in particular to a brush seal that is interposed in the leakage path between rotating and stationary members of a gas turbine engine and that is less subject to bristle chamfering.

BACKGROUND OF THE INVENTION

A turbofan gas turbine engine operates according to well known principles wherein an incoming air stream flows through the engine along an annularly configured, axially extending flow path. A portion of the incoming air stream is compressed in a compressor section of the engine and then mixed with fuel and burned in a combustor section to produce a high energy, high temperature exhaust gas stream. The gas stream exits the combustor and subsequently passes through a turbine section that extracts energy from the exhaust gas stream to power the compressor and produce bypass thrust by rotating a fan that acts generally on the remaining portion of the incoming air stream.

Uncontrol led leakages of gases within the engine contributes to a reduced engine efficiency. Seals are used to control this energy loss by interposing them in a leakage path to reduce the volume or mass of the gas—atmospheric air, exhaust, or otherwise—passing from one part of the engine to the other. In the past engine seals have principally taken the form of labyrinth seals. The use of brush seals as a substitute for labyrinth seals is presently being investigated.

A typical brush seal includes a plurality of seal stages with each stage including a bristle pack having a plurality of bristles. The bristle pack is disposed between a pair of annularly configured plates. Usually the bristles are disposed at about a forty five degree angle to a radius drawn from the engine center line. A brush seal is usually attached along its outer circumferential edge to a stationary portion of the engine with the inward, free ends of the bristles disposed in a sealing engagement with a sealing surface on a rotating engine part. Brush seals are not intended to function so as to completely seal one engine section from another, but rather rely upon the tortuous flow path created between the bristles to reduce the airflow from one part of the engine to another and to control the pressure drop between the engine parts.

The bristles in the bristle pact are somewhat flexible; thus, they are able to bend during an engine transient and still retain their sealing ability after the transient has passed. Examples of such transients include differential thermal growth between the engine parts, rotor/stator relative movement, and vibration of some sort. Thus, a rotating engine shaft, for example, may enter a vibration mode where the shaft is vibrating about its longitudinal axis, that is, when the shaft is rotating eccentrically.

The sealing efficiency of a brush seal over time is affected by the wear on the bristle ends contacting the sealing surface on the opposing engine part, as well as the overall contact of the bristle ends with the sealing surface. Worn bristles ends will dictate replacement of the seal or particular seal stage earlier than otherwise would be necessary, thereby increasing engine operating costs. Eccentric rotation of a rotor shaft can create such unwanted bristle wear.

Eccentric shaft rotation has been found to induce a one per revolution unsteady flow with respect to the stationary bristles. The unsteady flow causes the bristles to vibrate as cantilever beams with the free ends of the bristles deflecting radially, tangentially, and axially. Radial deflection of the free ends inwardly increases the rubbing force between the free ends of the bristles and the sealing surface, thereby causing the free ends to wear. Because the amplitude of the induced vibration decreases axially from the inlet or upstream side of the seal to the outlet or downstream side of the seal, the upstream bristle free ends experience wear to a greater extent than the downstream free ends. Thus, the bristle pack is chamfered by the one per revolution induced excitation of the bristles.

It would be desirable to increase the lifetime and sealing efficiency of brush seals by reducing chamfering of the bristle pack caused by one per revolution induced vibrations during eccentric rotation of a rotor shaft.

SUMMARY OF THE PRESENT INVENTION

There is provided by the present invention apparatus including a brush seal and a means for reducing chamfering of the bristle pack of the brush seal disposed in a leakage path between stationary and rotating members of a fluid flow machine. In each of the embodiments of the present invention to be described herein the brush seal includes at least one stage that includes a bristle pack and an upstream and a downstream plate sandwiching the bristle pack, with the bristle pack having upstream and downstream sides and having a plurality of bristles. Each seal further includes means for reducing the one per revolution excitation of the bristles caused by eccentric rotation of the rotating member. In one embodiment of the present invention the means comprises a damper that engages the upstream side of the bristle pack to absorb vibrations in general and radially inwardly directed vibration of the bristle tips in particular. The damper may comprise a shim held in place against the upstream side of the bristle pack by upstream to downstream airflow during machine operation and by retaining pins at other times; by a spring means that engages a mounting plate disposed upstream of the upstream plate; or by disposing it between the upstream plate and the upstream side of the bristle pack. In another embodiment the damper may comprise a sheet metal spring loaded against the upstream side of the bristle pack.

The foregoing invention and its advantages over the prior art will become apparent to those skilled in the art when the following detailed description of the invention is read in conjunction with the accompanying drawings and claims. Throughout the drawings, like numerals refer to similar or identical parts.

DETAILED DESCRIPTION OF THE INVENTION

Figure 1:
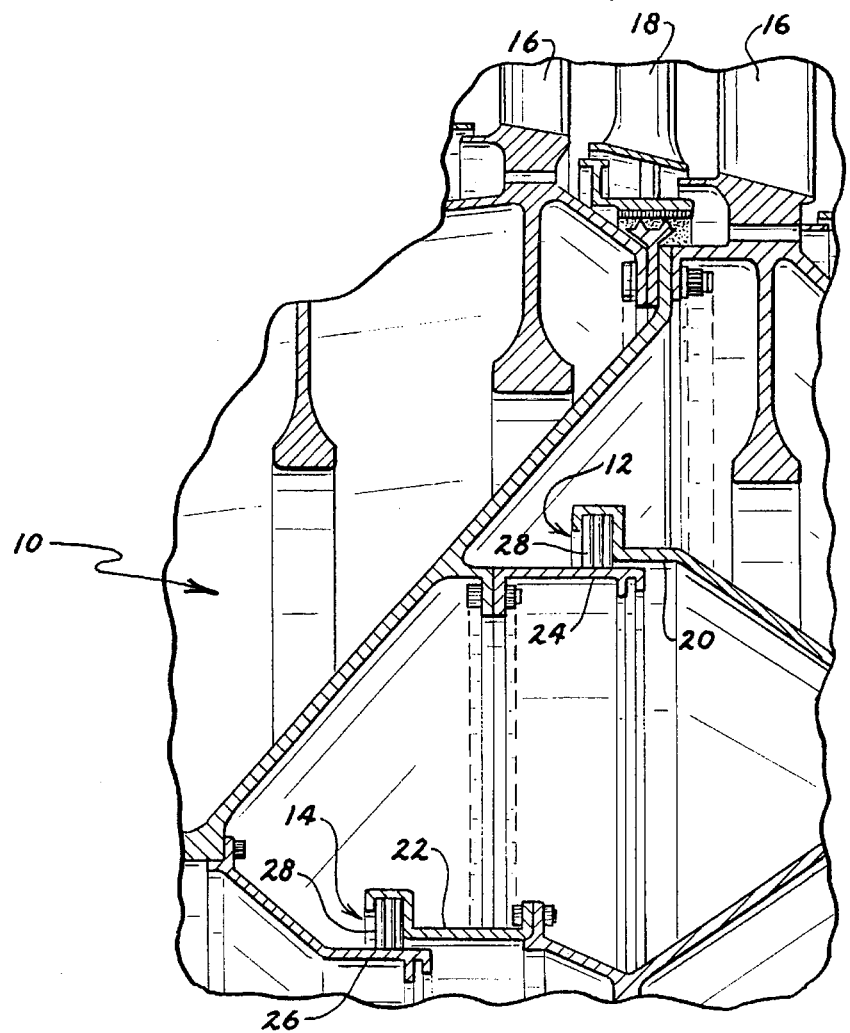
FIG. 1 shows a gas turbine engine in a partial cross sectional, side elevation view and indicates a potential application use of the present invention as herein described.

The present invention is described and shown in the accompanying FIGS. 3–10 relative to its application in an aircraft gas turbine engine 10 shown in a partial cross sectional, side elevation view in FIG. 1. A pair of brush seals 12 and 14 are shown in place in a portion of a turbine section of gas turbine engine 10. As is well known, a turbine section includes a plurality of circumferential rows of substantially radially directed rotor blades 16 interdigitated with one or more circumferential rows of substantially radially extending stator vanes 18. Brush seals 12 and 14 are interposed between stationary engine structural members 20, 22 and rotating members 24, 26, respectively. As generally indicated, seals 12 and 14 each include a plurality of bristles 28 that extend from a fixed connection at one end to stationary member 20 and 22 to a sealing engagement with the rotating members 24 and 26. The configuration of brush seals 24 and 26 will be explained in greater detail with reference to FIG. 2.

Figure 2:
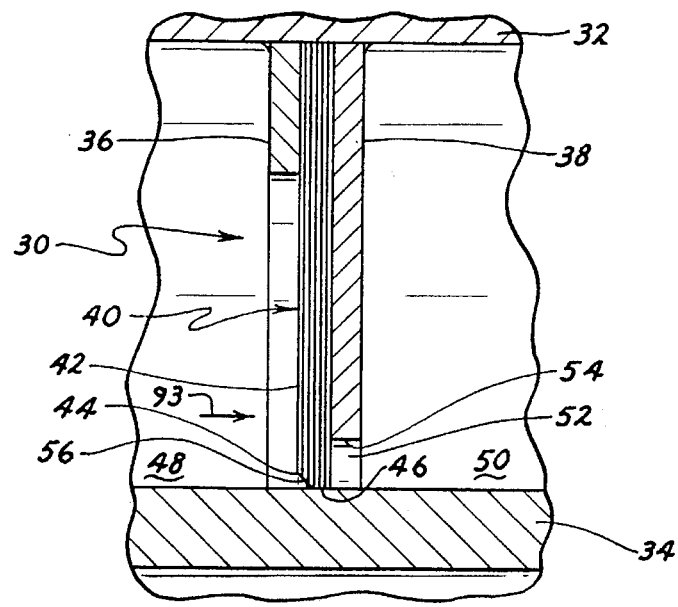
FIG. 2 shows in enlarged detail a prior art seal having a chamfered bristle pack due to one per revolution induced vibration.

FIG. 2 illustrates a prior art application of a brush seal 30. Brush seal 30 is interposed between a stationary member 32 and a rotating member 34. Seal 30 typically comprises a plurality of substantially identical seal stages, although only one such stage is shown here for purposes of illustration. It will be understood that each stage in a multiple stage brush seal will typically be substantially identical to all other stages in the seal. Each stage includes an annularly configured front or upstream plate 36 and an annularly configured rear or downstream plate 38 sandwiching a bristle pack 40 that includes a plurality of bristles 42, respectively. Bristles 42 each have a free end or bristle tip 44 that sealing engages a sealing surface 46 of rotating member 34. Brush seal 30 is interposed between an upstream portion 48 and a downstream portion 50 of a leakage path 52 existing between members 32 and 34. Brush seal 30 is disposed in leakage path 52 to control the flow of gas through the seal. This gas flow may be an atmospheric air stream, the exhaust gas stream exiting the compressor, or a combination of the two streams, and it will be understood that "gas" as used hereafter refers to both or to any gaseous phase of matter. It will also be understood that leakage path 52 is partially defined by the clearance gap between rotating member 34 and the inner surface 54 of downstream plate 38.

FIG. 2 further illustrates the form of bristle wear known as chamfering that can occur as a result of eccentric rotation of the rotating member 34. The aforementioned deflections of the bristle tips caused by the eccentric rotation will create an irregular wear pattern on the free ends of the bristles themselves. Thus, the bristles at the forward or upstream portion of the bristle pack will experience a greater wear than those downstream. The upstream or seal inlet side bristles tips 44 have experienced a radially outward wear to a greater extent than those bristle tips farther downstream. This has resulted in the creation of the chamfer 56 of the bristle pack as shown. This irregular wear pattern itself will contribute to the loss of sealing efficiency since it will take less turbulent air to cause the aforementioned bristle tip deflections to occur, and create a greater likelihood of seal blow-by. The unworn, upstream side of the bristle pack 40 is shown in in FIG. 2.

FIGS. 3–10 represent various embodiments of the present invention wherein an improved seal includes means for reducing one per revolution induced bristle vibration that causes chamfering of the bristle pack. Thus, referring now to FIGS. 3 and 4, an embodiment of the present invention will now be described. Thus, a single stage seal 70 includes an upstream plate 72 and a downstream plate 74 sandwiching therebetween a bristle pack 76 having a plurality of bristles 78. Seal 70 is disposed between members 80 and 82. Where seal 70 is disposed in a gas turbine engine such as engine 10, member 82 would generally be a rotating member and member 80 would be stationary. Furthermore, in such an application, front or upstream plate 72 and back or downstream plate 74 will each have a substantially annular configuration. Seal 70 is disposed within the leakage path between members 80 and 82. The leakage path is defined generally by the inwardly directed surface 84 of member 80 and the outwardly directed surface 86 of member 82. Bristles 78 are held together at their outer ends by means such as welding as indicated by weld bead 88.

Figure 3:
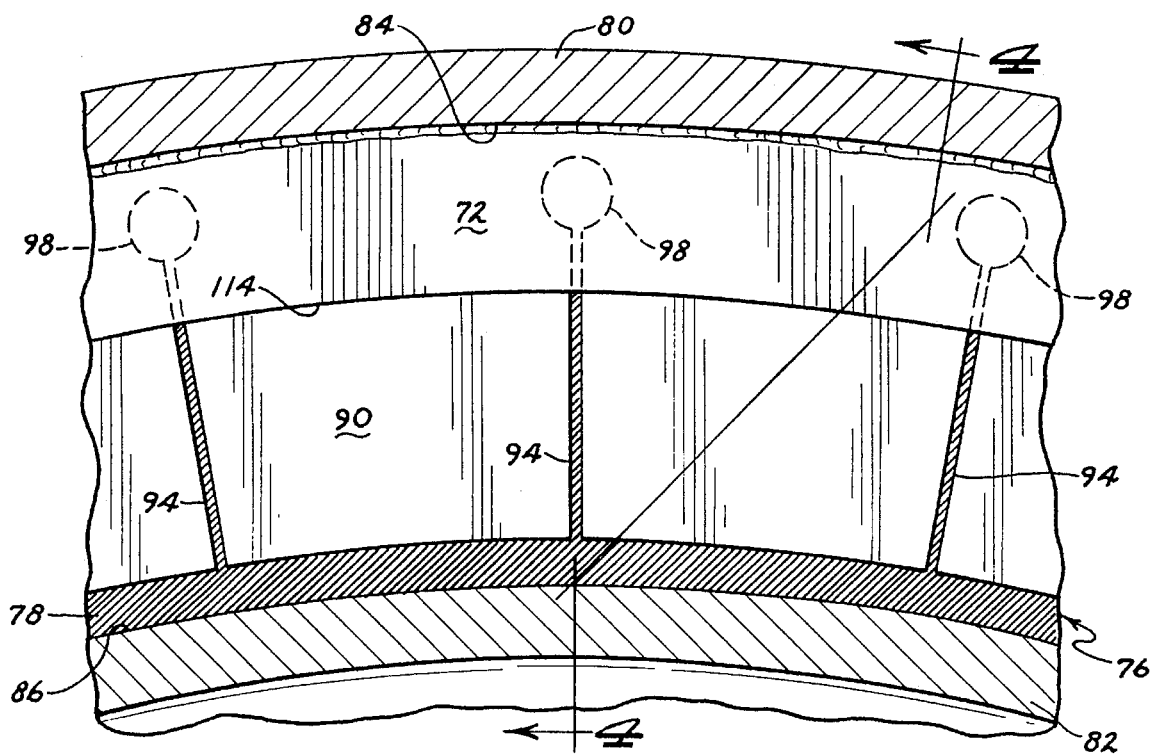
FIG. 3 shows an embodiment of the present invention wherein a thin damping plate is disposed substantially flush against the inlet side of the bristle pack and the upstream plate.

To reduce the one per revolution excitation of the bristles 78 of bristle pack 76, a damper 90 has been disposed so as to bear against the upstream side 92 of bristle pack 76. Damper 90 is held against bristle pack 76 by its positioning between upstream plate 72 and the upstream side 92 of bristle pack 76. Furthermore, during operation of the engine, a gas stream as indicated by arrow 93, will be flowing from the upstream to the downstream side of seal 70 and will exert pressure on damper 90 so as to force it to bear against bristle pack 76. As best seen in FIG. 3, damper 90 includes a plurality of elongate slots 94 extending from the inner side 96 substantially radially outwardly toward the stationary member 80. Each slot 94 preferably terminates in a circular aperture 98 to reduce the likelihood of fatigue cracking of damper 90. As embodied in a fluid flow machine, such as a gas turbine engine, damper 90 would have a substantially annular configuration.

Figure 4:
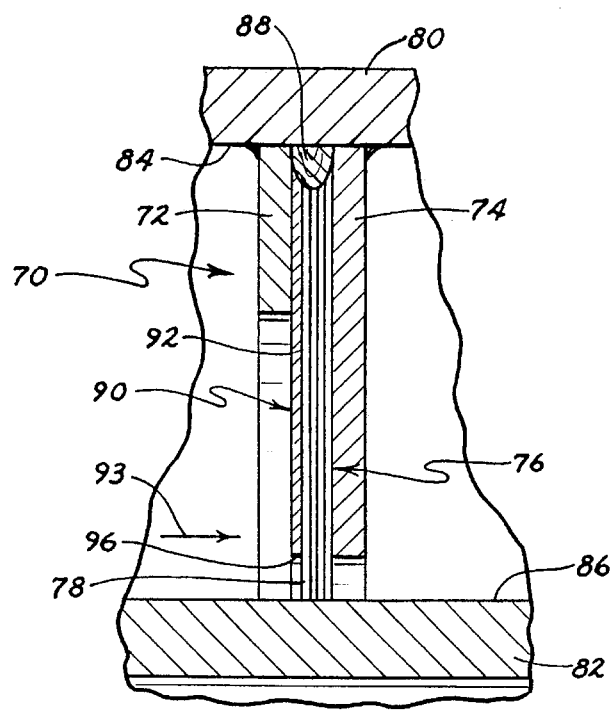
FIG. 4 illustrates in a cross sectional view the embodiment shown in FIG. 3 taken along cutting plane 4—4 thereof.
Figure 6:
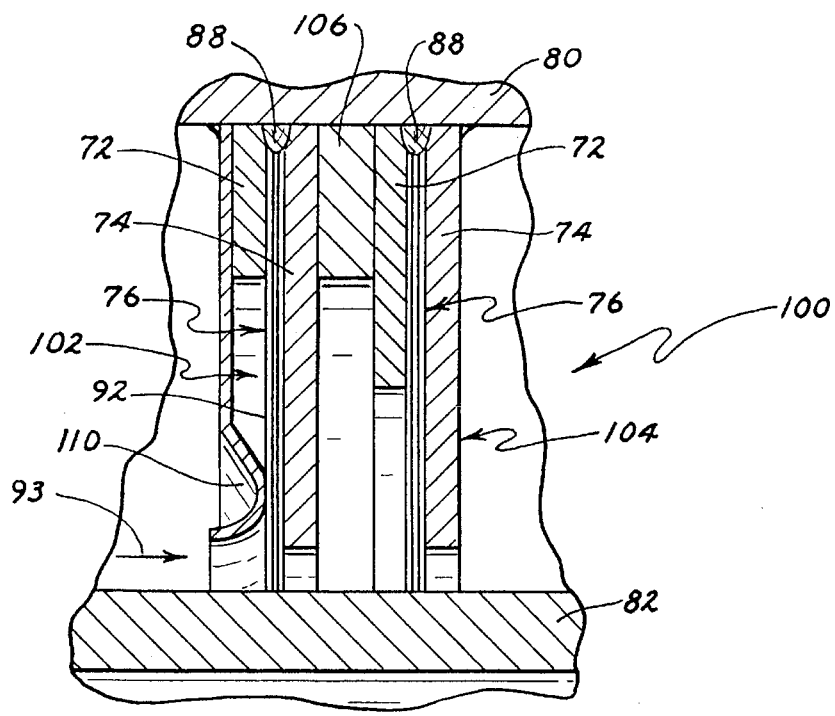
FIG. 6 illustrates in a cross sectional view the embodiment shown in FIG. 5 taken along cutting plane 6—6 thereof.
Figure 5:
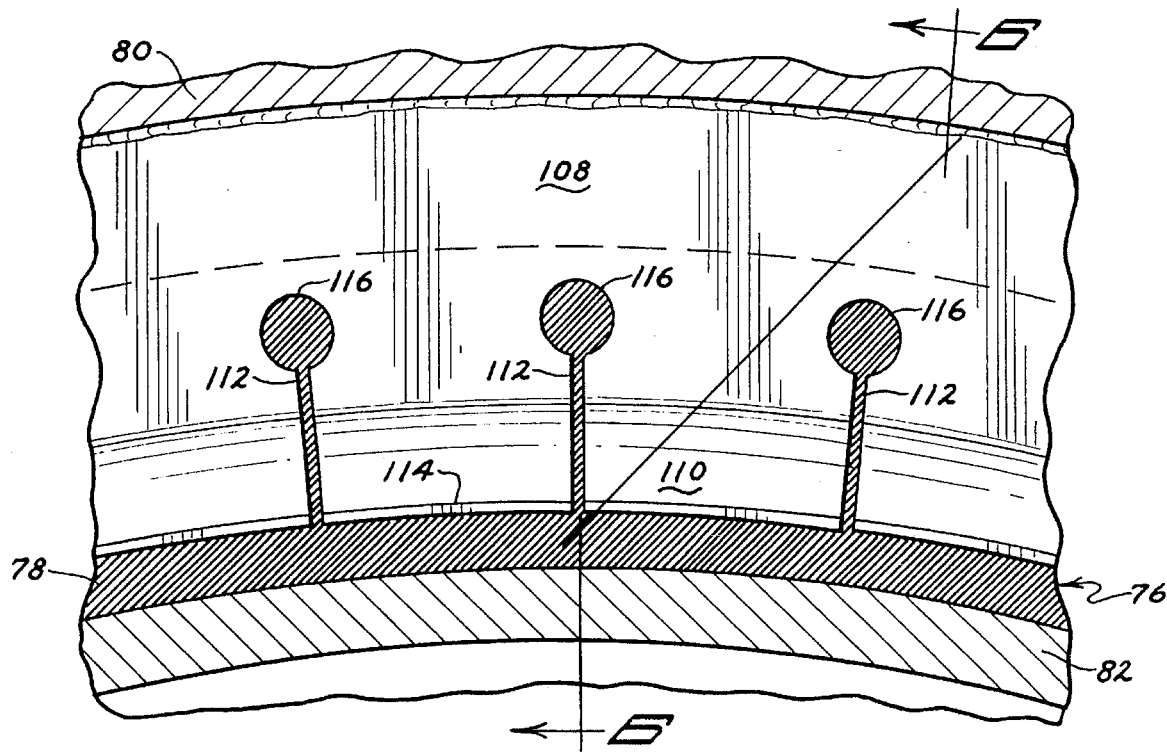
FIG. 5 illustrates another embodiment of the present invention wherein a spring member bears against the inlet side of the bristle pack to damp and detune the vibrations induced by eccentric rotor rotation.

Referring now to FIGS. 5 and 6, another embodiment of the present invention will be described. Thus, FIG. 5 and 6 illustrate a brush seal 100 having at least two stages substantially identical to those of FIGS. 3 and 4. Thus, it will be understood that the description of the seal itself with reference to FIGS. 3 and 4 is also applicable to the seal of FIGS. 5 and 6. It will be understood, however, that the seal 100 includes stages 102 and 104 separated by a spacing ring 106. Seal 100 also includes a damper 108 comprising a sheet metal spring element having a radially inwardly disposed spring 110 that is loaded against bristle pack 76 of upstream seal stage 102. Spring 110 has a substantially curved configuration and bears against bristle pack 76. As shown in FIG. 5, damper 108 when used in a fluid flow machine will have a substantially annular configuration and will include a plurality of elongate slots 112 that extend from the inner edge 114 and extend substantially radially outwardly to a terminus in a circular aperture 116. Damper 108 is disposed forwardly of the upstream plate 72 of upstream seal stage 102 and may, if desired, be rigidly attached thereto. In addition to the loading produced by the action of the spring element 110 of damper 108 bearing against the upstream side 92 of bristle pack 76, upstream air flow as indicated by arrow 93 during engine operation will also act to load damper 108 against the upstream side 92.

Figure 7:
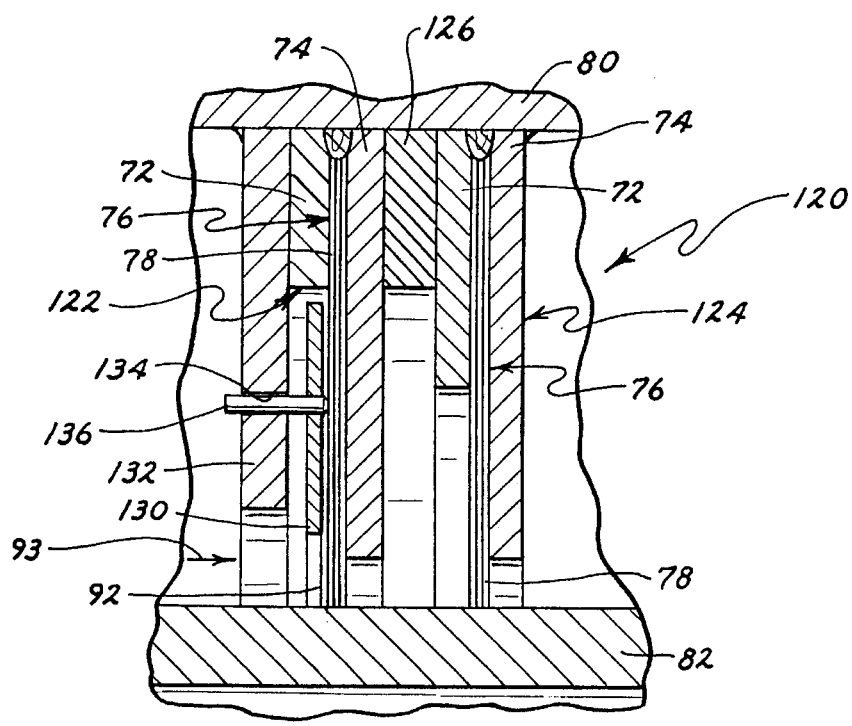
FIG. 7 illustrates another embodiment of the present invention wherein a metal shim held in place against the inlet side of the bristle pack by a retaining pin bears against the bristle pack damp and detune the vibrations induced by eccentric rotor rotation.
Figure 8:
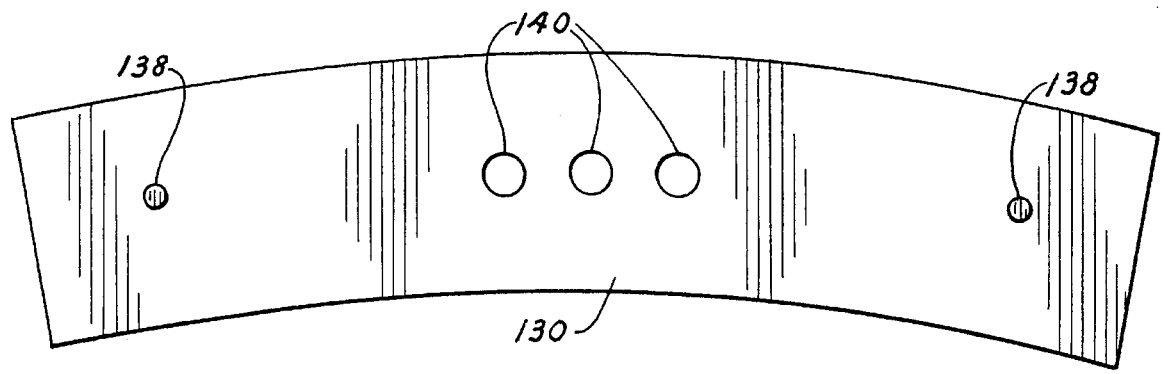
FIG. 8 shows in a front elevation view the metal shim of the embodiment of FIG. 7.

FIGS. 7 and 8 represent another embodiment of the present invention wherein a multistage brush seal 120 including upstream and downstream seal stages 122 and 124 constructed substantially similar to the aforementioned and described brush seals. Seal stages 122 and 124 are separated by a spacing ring 126 though such may be omitted if desired. Seal 120 further includes a damper apparatus 128 comprising a shim 130, seen in a front elevation view in FIG. 8. Shim 130 is loaded against the front or upstream side 92 of upstream seal stage 122 bristle pack 76 by the upstream to downstream air flow during engine operation as indicated by arrow 93. Apparatus 120 further includes an annular mounting plate 132 disposed upstream of upstream seal plate 72 of upstream stage 122. Mounting plate 132 is attached to stationary member 80. Mounting plate 132 includes a plurality of through holes 134 that receive a retaining pin 136 that extends axially downstream towards first stage 122 and towards shim 130. Shim 130 in turn includes a plurality of pin receiving holes 138 that receive the retaining pin 136. Pins 136 act to retain shim 130 in position when the engine is not operating. Shim 130 can be a substantially singular annular piece or as indicated in FIG. 8, may comprise annular sectors. Shim 130 further includes a plurality of air metering holes 140.

Figure 9:
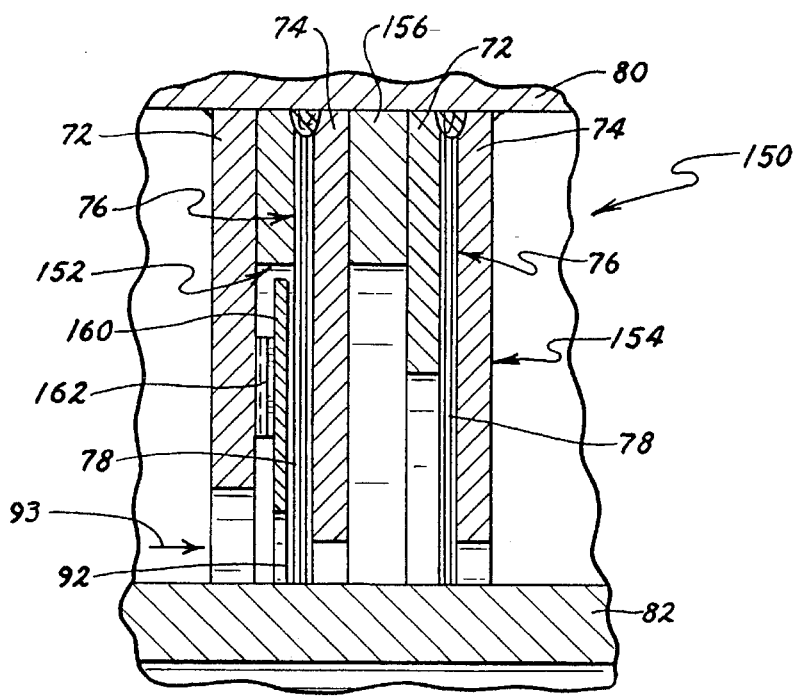
FIG. 9 depicts another embodiment of the present invention wherein a metal shim bears against the inlet side of the bristle pack by means of a spring element disposed between the metal shim and a mounting plate.
Figure 10:
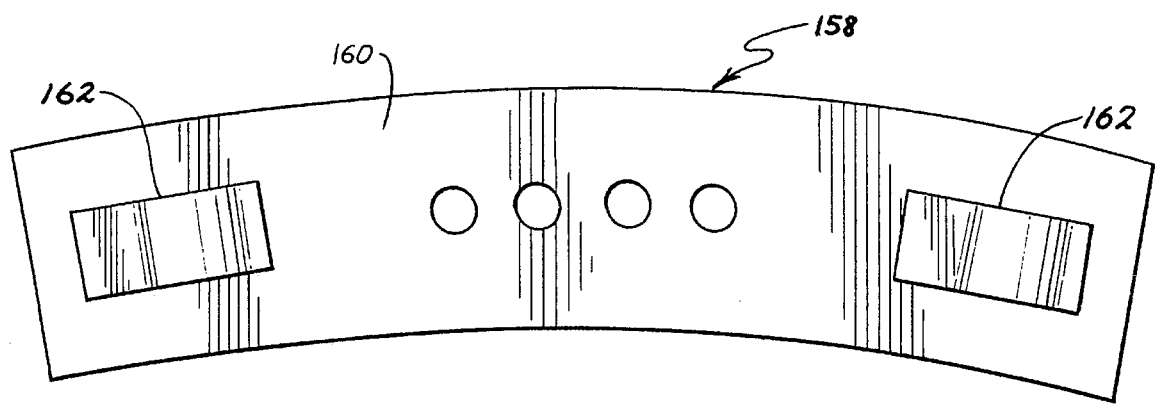
FIG. 10 shows in a front elevation view the spring loaded metal shim depicted in FIG. 9.

Referring now to FIGS. 9 and 10, another embodiment of the present invention will be described. Thus, as seen in these FIGURES, a multiple stage seal 150 includes upstream and downstream seal stages 152 and 154 constructed substantially as previously described and separated by a spacer ring 156 which as previously noted may be omitted. Seal 150 includes a damper apparatus 158 comprising a shim 160 biased against the upstream side 92 of bristle pack 76 of upstream seal stage 152. Shim 160 is spring biased against the bristle pack by a plurality of spring elements 162 that are disposed between shim 160 and a mounting plate 164 mounted to member 80 forwardly of upstream plate 72 of upstream seal stage 152. In addition, as with the other dampers previously described, shim 160 will be loaded against bristle pack 76 of upstream seal stage 152 by the downstream air flow of gases as indicated by arrow 93. Shim 160 as with shim 130 shown in FIGS. 7 and 8, may comprise an annular ring or may comprise a plurality of sectors of an annulus as shown in FIG. 10.

Thus the present invention provides an improved brush seal that is subject to less irregular bristle wear and results in greater engine efficiency. Each embodiment of the improved brush seal shown and described herein includes a structural member that reduces the chamfering of the bristle pack associated with the eccentric rotation of the rotating member. The present invention when utilized in a gas turbine engine will result in a brush seal having a greater lifetime due to a reduction in irregular bristle wear as well as a more efficient seal, which will increase overall engine efficiency and reduce operating costs.

The present invention having thus been described, other modifications, alterations, or substitutions may now suggest themselves to those skilled in the art, all of which are within the spirit and scope of the present invention. It is therefore intended that the present invention be limited only by the scope of the attached claims below.

We claim:

1. Sealing apparatus for sealing a leakage path extending axially from a high pressure, upstream region to a low pressure, downstream region between a rotating member and a stationary member of a fluid flow machine, said apparatus comprising:

a brush seal having at least one stage, said stage including a bristle pack sandwiched between upstream and downstream plates, said plates being attached to said stationary member, said bristle pack including a plurality of bristles, said bristles having free ends that sealingly engage said rotating member; and a damping plate disposed between said upstream plate and said bristle pack, said damping plate bearing against said upstream side of said bristle pack and having a substantially planar, annular configuration with a radially inside edge, said damping plate including a plurality of substantially radially directed slots extending from said inside edge outwardly, said slots being provided for absorbing vibrations.

2. A brush seal for sealing a leakage path extending axially from a high pressure, upstream region to a low pressure, downstream region between a rotating member and a stationary member of a fluid flow machine, said brush seal having at least one stage, said stage including a bristle pack and an upstream and a downstream plate, said plates being attached to said stationary member and sandwiching said bristle pack, said bristle pack having upstream and downstream sides and having a plurality of bristles, said seal further including a damping plate disposed between said upstream plate and said bristle pack, said damping plate bearing against said upstream side of said bristle pack and having a substantiality planar, annular configuration with a radially inside edge, said damping plate including a plurality of substantially radially directed slots extending from said inside edge outwardly, said slots being provided for absorbing vibrations.

* * * * *